2,867,548

METHOD OF FLAMEPROOFING FIBERS, COMPOSITIONS USED THEREIN AND THE RESULTING PRODUCTS

Arthur Dock Fon Toy and Robert S. Cooper, Park Forest, and Thornton P. Traise, South Chicago Heights, Ill., assignors to Victor Chemical Works, a corporation of Illinois No Drawing. Application September 22, 1953
Serial No. 381,761

27 Claims. (Cl. 117—136)

This invention relates to the flameproofing cellulosic fibers, the flameproofed material produced therefrom, and the method of preparing a flameproofing solution for flameproofing said fibers.

The process is accomplished by treating the fabric with a polymer or partially brominated polymer of a di beta, gamma alkenyl beta-cyanoethanephosphonate and thereafter curing the impregnated material at a moderate temperature.

Suitable starting compounds for use in the new flameproofing process are diallyl and dimethallyl esters of beta-cyanoethanephosphonate. The preparation of these monomeric starting compounds is described in the co-pending application of A. D. F. Toy and R. S. Cooper, Serial No. 381,765, filed September 22, 1953, now Patent No. 2,844,558. Such esters are prepared by reacting a dialkenyl phosphite with acrylonitrile in the presence of a sodium alkenolate catalyst under suitable reaction conditions. The reaction involved in the preparation of the monomeric dialkenyl beta, cyanoethanephosphonate may be illustrated by the equation:

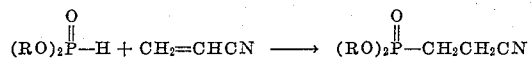

where R is an allyl or methallyl group.

The recovered ester compound may be employed with or without further purification in the present flameproofing process. Generally, it is preferred to use the distilled ester.

In the practice of the present invention the di beta, gamma alkenyl beta-cyanoethanephosphonate is dissolved in an equal weight of a solvent, such as "Chlorex" (B,B' dichloroethyl ether), mixed with a small amount of a polymerization catalyst such as benzoyl peroxide and slowly heated until the viscosity of the solution has increased to about 2 to 4 times its original value. This change in viscosity is indicative of the degree of polymerization. With a viscosity change of four times, the degree of conversion to the partial polymer is of the order of 30 to 40%. The solution is then cooled and the partial polymer separated for use in the preparation of the fabric treating solution.

The separation of the partial polymer is effected by adding to the above solution a selective solvent such as ethyl ether, ethyl acetate or mixtures of ethyl acetate and hexane, and the like in which the partial polymer is substantially insoluble. The partial polymer is then separated by filtration or decantation and washed with additional quantities of a selective solvent. The separated partial polymer is generally in the form of a hard solid or gummy mass depending on the amount of occluded monomer and the selective solvent employed. It is preferred that all monomeric ester be removed from the partial polymer before using the latter in the impregnating solution, though satisfactory flameproofing may be effected using the crude gummy partial polymer.

The partial polymer prepared in the above manner is then dissolved in a suitable volatile solvent to form the fabric impregnating bath. We prefer to use a mixture of 30 parts methanol or ethanol and 70 parts of ethylene dichloride, by volume, as the solvent, with the concentration of the partial polymer in the solvent being about 25% to 50%. The fabric is treated with this solution for a few minutes to allow good penetration following which the fabric is wrung out and cured by heating at approximately 100° C. for about 30 minutes. The resulting fabric has excellent flame resistant qualities which are not destroyed by subsequent washing in ordinary soap solutions.

The flameproofing character of the treated fabric is customarily tested according to the method described as the Vertical Flame Resistance Test in the Supplement to Federal Specifications for Textiles; General Specifications Test Method CCC–T–191a or B (Method No. 5902). In this method a 2½ inch by 10 inch strip of the treated cloth is suspended vertically and ignited at the bottom with a Bunsen burner. Flame resistance is measured by the burning time of the cloth, total char length of the burn, and amount of afterglow. A flameproofing process is generally held to be satisfactory if the burning time is less than 12 seconds, char length less than 9 inches and afterglow negligible. In addition to the above tests an indication of the value of the flameproofing process, particularly with reference to the flameproofing of clothing, is the character of the remaining char. A coherent, porous, reasonably flexible char is highly desirable because of its insulation qualities. Fabrics treated according to the methods of this invention easily meet the above specifications.

In typical examples according to our new flameproofing process a diallyl beta-cyanoethanephosphonate ester was dissolved in an equal weight of "Chlorex" (B,B' dichloroethyl ether) in a three necked flask equipped with stirrer, thermometer, nitrogen inlet and pipette with bulb attached. The temperature was raised to 85° C. with stirring under a nitrogen atmosphere. Benzoyl peroxide was added to catalyze the polymerization. Polymerization was permitted to proceed until the change in viscosity was such that the discharge time through a 5 ml. pipette was three to four times that required for the starting solution. At this point the solution was quickly cooled with an ice bath. The partially polymerized ester was then separated from the solution by adding a solvent or combination of solvents in which the prepolymer is insoluble, for example, ethyl acetate, hexane acetone, and the like.

After separating the solid prepolymer it was dissolved in a 30/70 methanol or ethanol/ethylene chloride solution and this solution evaporated to the desired concentration for use in impregnating the cellulosic fabric. For test purposes a strip of standard muslin or army twill cloth 20" by 2½" in size was dipped into the above solution for 5 minutes, wrung out, dried and cured in an oven at 100–108° C. The test strip of cloth was cut in half and one-half washed in 200 ml. water containing 0.5 gram soap at a temperature of 140° F. Both the washed and unwashed test strips were subjected to the standard flame test previously described. The data relating to the process and the flame test results are given in the following table.

| Experiment No | 257 | 258 | 261 | 262 | 336 | 206 | 212 |
|---|---|---|---|---|---|---|---|
| Diallyl-cyanoethanephosphonate | 100 g | 50 g | 50 g | 50 g | 300 g | 50 g | 50 g. |
| Chlorex (B,B' dichloroethyl ether) | 100 g | 50 g | 50 g | 50 g | 300 g | 50 g | 50 g. |
| Benzoyl peroxide catalyst | 1.5 g | 1.5 g | 1.0 g | 1.25 g | 9 g | 1.25 g | 1.25 g. |
| Time of polymerization | 1 hr., 35 min | 38 min | 1 hr., 20 min | 1 hr., 33 min | 1 hr., 47 min | 2 hr., 17 min | 40 min. |
| Changes in viscosity (times) | 4.2 | 4.2 | 4.0 | 4.05 | 4.0 | 3.0 | 4.0 |
| Isolation solvent | Acetone (100 ml.), hexane (3 l.) | Ethyl acetate (6,500 ml.) | Hexane (1,450 ml.), ethyl acetate (400 ml.) | Ethyl acetate (400 ml.), hexane (200 ml.) | Ethyl acetate, hexane | Hexane | Ethyl ether. |
| Conversion to polymer | 32% | 34.2% | 30.8% | 34.4% | 37% | | 41.4% |
| Character of separated polymer | Solid | Solid | Solid | Solid | Solid | Gummy mass | Solid. |
| Impregnating soln.: (30/70 methanol/ethylene chloride). | | | | | | | |
| Concentration (g./ml.) | 0.2348 | 0.2493 | 0.2324 | 0.25 approx | 0.1627 | 0.25 approx | 0.32. |
| Add-on to muslin cloth | 28.0% | 38.2% | 29.5% | 34.4% | 14.4% | 39.0% | 50.9%. |
| Loss on one washing | 3.1% | 6.6% | 5.3% | 1.8% | 3.64% | 10.7% | 11.6%. |
| Flame tests: | | | | | | | |
| Unwashed— | | | | | | | |
| Burning time | 7 sec | 7.5 sec | 7.0 sec | 7 sec | 8 sec | 8 sec | 7.0 sec. |
| Char length | 4⅝" | 4⅞" | 4⅞" | 4⅞" | 5⅛" | 4" | 3½". |
| Washed— | | | | | | | |
| Burning time | 7 sec | 9.0 sec | 7 sec | 7.5 sec | 8.5 sec | 8 sec | 6 sec. |
| Char length | 3⅝" | 4" | 4¹¹⁄₁₆" | 4" | 3⅝" | 3¾" | 4½". |
| Character of char | OK | OK | OK | OK | OK | OK | OK. |

In addition to the above described procedure we have found that a highly satisfactory flameproofing bath may be prepared by an emulsion polymerization procedure. Under this procedure the dialkenyl beta, cyanoethanephosphonate is dispersed in a dilute aqueous solution of polyvinyl alcohol, heated to about 75–80° C. and a polymerization catalyst added slowly while stirring. The emulsion, with continuous stirring, is maintained at a temperature of about 80° C. for 2 to 20 hours to effect the desired degree of polymerization. The emulsion thus produced is cooled and employed directly as a fabric treating bath. Fabrics or fibers treated with such emulsions are dried, cured and tested for flameproofness in accordance with the procedures outlined above.

In an example using the emulsion procedure 53.65 grams of diallyl beta, cyanoethanephosphonate were placed in a liter flask equipped with stirrer, thermometer and dropping funnel. While rapidly stirring 92.5 ml. of a 2% aqueous solution of polyvinyl alcohol was added, producing an emulsion. The emulsion was buffered by the addition of 5 grams sodium bicarbonate and solution of 2.15 grams potassium persulfate in 92.5 ml. water added slowly after the temperature of the emulsion had been raised to about 76–78° C. The mixture was held at this temperature for about three hours while completing the polymerization. The emulsion thus produced was cooled to room temperature and used for flameproofing a cotton muslin cloth.

The cloth was treated with the emulsion, wrung out, dried and cured one hour at 98° C. The "add-on" or gain in weight of the cloth was 20.4%. In flameproofing tests the char length was 4⅝" and the burning time was 7 seconds with the treated but unwashed fabric.

In another example 58 grams of the diallyl beta, cyanoethanephosphonate were emulsified with 92.5 ml. of a 2% aqueous solution of polyvinyl alcohol and 2.5 grams of a nonionic surface active agent. The emulsion was buffered with 5 grams sodium bicarbonate. 92.5 ml. of water and 1.74 grams of potassium persulfate were then added and the temperature maintained at about 76°–81° C. for 2½ hours to effect polymerization of the phosphonate. The resulting emulsion was then used to flameproof an Army twill fabric. The cloth was dipped in the emulsion, wrung out, dried and cured 14 minutes at about 140° C. and retreated a second time in the same manner. The treated cloth showed an "add-on" of 29.2% with a retained "add-on" of 69.6% of the original "add-on" after washing with a 0.5% soap solution.

Flameproofing tests showed char length of 6⅞ inches and a burning time of 10 seconds for the unwashed cloth, and a char length of 6¼ inches and a burning time of 9.8 seconds after washing.

Nonionic surface active agents may be included in the emulsion procedure, as in the above example, to improve the stability of the emulsion and facilitate the impregnation of the fabric. A suitable group of nonionic surface active agents are the reaction products of olefine oxides with lauryl acid ortho and pyrophosphates.

We do not fully understand the theory or mechanism of attaching the above solution and emulsion polymers to the fibers in producing the permanent flameproofing effect, but believe the fibers are coated with the substantially polymerized phosphonate ester and upon curing, further polymerization of the prepolymer or retained traces of monomeric components firmly attaches the polymer to the fiber. Stiffness in the fabric is probably avoided by the prepolymerization of the ester before treating the fabric in order to limit the amount of polymerization taking place in the curing step, and thereby substantially limiting the cross welding of one fiber to another in the fabric.

In the solution polymerization procedure the degree of prepolymerization is controlled by regulating the change in viscosity of the solution. If desired, any remaining unsaturation in the prepolymer may be reduced by the addition of bromine. This modification of the procedure may be employed to further control the amount of polymerization which may take place in the final curing of the treated fabric.

In a typical example using the modified bromination procedure 50 grams of diallyl beta, cyanoethanephosphonate was dissolved in 50 grams B,B'-dichloroethyl ether and polymerized in the presence of 3% benzoyl peroxide at 85° C. to a viscosity change of 4 times. The partial polymer was then precipitated in 500 ml. of ethyl acetate and washed with an additional 250 ml. of ethyl acetate. The crude partial polymer was then worked up in 400 ml. of hexane and separated as a solid powder. This powdered product was dissolved in 81.5 ml. of a 30/70 mixture methanol and ethylene chloride and brominated at 10° C. by passing in bromine to the extent of 0.5 gram bromine per gram of the resin. After stirring for one-half hour the solution was neutralized with 5.5 ml. of triethylamine and concentrated to 25% strength under vacuum to produce the final treating bath. A strip of Army twill cloth was submerged in the solution for 5 minutes, wrung out, dried and cured at 100° C. The treated cloth showed a 21% "add-on" (increase in weight). After washing in a 0.5% soap solution the cloth retained 41% of the treating composition. Flame resistance tests on the unwashed fabric showed a char length of 5¼ inches and a burning time of 8 seconds. After washing the flame test showed a char length of 4¾ inches and a burning time of 9 seconds, thus, indicating a satisfactory permanent flameproofing effect.

The term "add-on" as used in the above examples means the amount of polymer attached on the fabric and is expressed as percentage by weight of the untreated fabric. The percentage of "add-on" will vary with the strength of the impregnating solution, the method removing the excess solution from the impregnated fabric, and the number of impregnation treatments. For satisfactory results the amount of "add-on" should be at least 10%, but generally we prefer to use from 15% to 40%. However, as little as 5% "add-on" will give an appreciable flameproofing effect.

The emulsion polymerization and flameproofing processes are described and claimed in the copending application of J. R. Costello, Jr. and T. P. Traise, Serial No. 381,762, filed September 22, 1953, now Patent No. 2,841,507.

The foregoing detailed description has been given for clearness of understanding only and no unnecessary limitations should be understood therefrom as modifications will be obvious to those skilled in the art.

We claim:

1. The method of flameproofing cellulosic fibers which comprises impregnating the fibers with a fabric impregnating bath containing a partial polymer of a beta, gamma, unsaturated dialkenyl beta, cyanoethanephosphonate, wherein each alkenyl group is a member of the class consisting of allyl and methallyl radicals, dissolved in a non-deleterious volatile solvent, removing a substantial amount of said solvent, and heating the impregnated fibers at a polymerizing temperature and for a time sufficient to effect further polymerization and attachment of the resulting polymer to the fibers.

2. The method of claim 1 wherein the polymer coating is present in an amount of at least about 5% by weight of the fibers.

3. The method of claim 1 wherein each alkenyl group is allyl.

4. The method of claim 1 wherein each alkenyl group is methallyl.

5. The method of claim 1 wherein the non-deleterious volatile solvent contains ethylene dichloride.

6. The method of claim 1 wherein the volatile solvent contains ethylene dichloride and an alchohol.

7. The method of claim 6 wherein the alcohol is a member of the class consisting of methanol and ethanol.

8. A flameproof material comprising cellulosic fibers having firmly attached thereto a polymer of a beta, gamma, unsaturated dialkenyl beta, cyanoethanephosphonate wherein each alkenyl group is a member of the class consisting of allyl and methallyl radicals.

9. The material of claim 8 wherein the polymer coating is present in an amount of at least about 5% by weight of the fibers.

10. The material of claim 8 wherein the polymer coating is present in an amount of about 15-40% by weight of the fibers.

11. The method of preparing a flameproofing solution which comprises polymerizing a beta, gamma, unsaturated dialkenyl beta, cyanoethanephosphonate, wherein each alkenyl group is a member of the class consisting of allyl and methallyl radicals, in a solvent medium until its viscosity has been substantially increased, separating the partially polymerized ester, and dissolving the partially polymerized ester in a non-deleterious volatile solvent to produce an impregnating solution.

12. The method of claim 11 wherein the phosphonate is polymerized in a solvent medium which contains a polymerization catalyst.

13. The method of claim 11 wherein the degree of conversion of the phosphonate material to the partial polymer is about 30–40%.

14. The method of preparing a flameproofing solution which comprises dissolving a beta, gamma, unsaturated dialkenyl beta, cyanoethanephosphonate, wherein each alkenyl group is a member of the class consisting of allyl and methallyl radicals, in a solvent medium, heating the solution at a polymerizing temperature until its viscosity has been substantially increased, selectively recovering the partially polymerized ester from the resulting solution by solvent extraction, and dissolving the partially polymerized ester in a non-deleterious volatile solvent to produce an impregnating solution.

15. The method of claim 14 wherein the phosphonate is heated in the presence of a polymerization catalyst.

16. The method of claim 14 wherein the degree of conversion of the phosphonate material to the partial polymer is about 30–40%.

17. The method of claim 14 wherein the solvent medium is B,B'-dichoroethyl ether.

18. The method of claim 17 wherein the solvent used in the extraction step is a member of the class consisting of ethyl ether, ethyl acetate, hexane, and mixtures thereof.

19. The method of flameproofing cellulosic fibers which comprises impregnating the fibers with a fabric impregnating bath containing a partially brominated partial polymer of a beta, gamma, unsaturated dialkenyl beta, cyanoethanephosphonate, wherein each alkenyl group is a member of the class consisting of allyl and methallyl radicals in a non-deleterious volatile solvent medium, removing a substantial amount of said solvent, and heating the impregnated fibers at a polymerizing temperature and for a time sufficient to effect further polymerization and attachment of the resulting polymer to the fibers.

20. The method of claim 19 wherein the degree of conversion of the phosphonate material is about 30–40%.

21. A flameproof material comprising cellulosic fibers having firmly attached thereto a partially brominated partial polymer of a beta, gamma, unsaturated dialkenyl beta cyanoethanephosphonate wherein each alkenyl group is a member of the class consisting of allyl and methallyl radicals.

22. The method of preparing a flameproofing solution which comprises polymerizing a beta, gamma, unsaturated dialkenyl beta, cyanoethanephosphonate, wherein each alkenyl group is a member of the class consisting of allyl and methallyl radicals, in a solvent medium, heating the solution until its viscosity has been substantially increased, separating the partially polymerized ester, dissolving it in a non-deleterious volatile solvent, and partially brominating the partially polymerized ester by adding bromine in sufficient amount to partially saturate the unsaturated double bonds remaining in the partial polymer.

23. The method of claim 22 wherein the phosphonate solution is heated in the presence of a polymerization catalyst.

24. The method of claim 22 wherein the phosphonate solution is heated in the presence of a small amount of polymerization catalyst.

25. The method of claim 22 wherein the degree of conversion of the phosphonate ester to the partial polymer is about 30–40%.

26. The method of flameproofing cellulosic fibers which comprises coating said fibers with a partial polymer of a beta, gamma, unsaturated dialkenyl beta, cyanoethanephosphonate, wherein each alkenyl group is a member of the class consisting of allyl and methallyl radicals, and heating to further polymerize the partial polymer and effect an attachment of the resulting polymer to the fibers.

27. A partially polymerized, partially brominated ester selected from the group consisting of diallyl and dimethallyl beta, cyanoethanephosphonates.

References Cited in the file of this patent

UNITED STATES PATENTS

| | | |
|---|---|---|
| 1,581,779 | Brandt | Apr. 20, 1926 |
| 2,660,542 | Walter et al. | Nov. 24, 1953 |
| 2,660,543 | Walter et al. | Nov. 24, 1953 |
| 2,681,920 | Van Winkle | June 24, 1954 |
| 2,686,768 | Frick et al. | Aug. 17, 1954 |
| 2,714,100 | Fon Toy et al. | July 26, 1955 |
| 2,725,311 | Kenega et al. | Nov. 29, 1955 |
| 2,780,616 | Dickey et al. | Feb. 5, 1957 |